United States Patent [19]
Gluncic et al.

[11] 3,855,222
[45] Dec. 17, 1974

[54] 2,4-DIAMINO-5-(3,45-TRIMETHOXYBENZYL)-6-ARYLSULFONYLPYRIMIDINES

[75] Inventors: Berislav Gluncic; Krunoslav Kovacevic, both of Zagreb, Yugoslavia

[73] Assignee: Pliva Pharmaceutical and Chemical Works, Zagreb, Yugoslavia

[22] Filed: Sept. 21, 1972

[21] Appl. No.: 290,839

[30] Foreign Application Priority Data
Oct. 4, 1971 Yugoslavia........................... 2501/71

[52] U.S. Cl. .......................... 260/256.5 R, 424/251
[51] Int. Cl............................................. C07d 51/42
[58] Field of Search .............................. 260/256.5 R

[56] References Cited
UNITED STATES PATENTS

| | | | |
|---|---|---|---|
| 2,673,204 | 3/1954 | Heinrich et al. | 260/256.4 C |
| 3,663,544 | 5/1972 | Milzner et al. | 260/256.4 E |

OTHER PUBLICATIONS

Brown, The Pyrimidines, Interscience, 1962, pp. 71–72.
Wagner et al., Synthetic Organic Chemistry, John Wiley & Sons, 1953, pp. 429–431, 599–601, 823.

*Primary Examiner*—Richard J. Gallagher
*Attorney, Agent, or Firm*—Kurt Kelman

[57] ABSTRACT

The invention relates to 2,4-diamino-5-(3,4,5-trimethoxybenzyl)-6-arylsulfonyloxypyrimidines.
These compounds have been found to have bacteriostatic activity similar to that of sulfaphenazole.

1 Claim, No Drawings

2,4-DIAMINO-5-(3,45-TRIMETHOXYBENZYL)-6-ARYLSULFONYLPYRIMIDINES

The invention relates to 2,4-diamino-5-(3,4,5-trimethoxybenzyl)-6-arylsulfonyloxypyrimidines of the general formula:

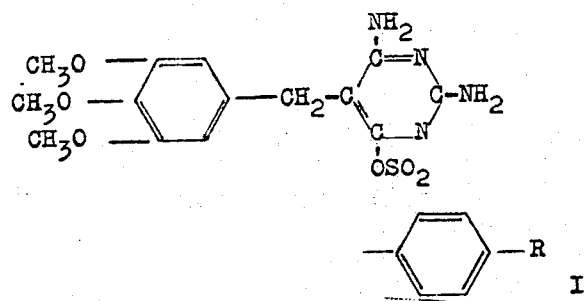

wherein R represents the radicals H, $CH_3$, Cl, Br, $NHCOCH_3$, and $NHCOCH_2CH_3$.

The compounds are new and have not been described in the literature. These compounds have activity similar to sulfaphenazole, i.e. 1-phenyl-5-sulfanilamidopyrazole and show bacteriostatic activity on test strains of *Streptococcus haemoliticus* in a concentration of 10 mcgs./ml. of nutrient medium and on E. coli and *Pseudomonas pyocyanae* in a concentration of 250 mcgs./ml. of nutrient medium. Against *Staphylococcus pyogenes aureus*, activity was noted, in a concentration of 250 mcgs./ml. of nutrient medium for compounds wherein R represents Br, $NHCOCH_3$, and $NHCOCH_2CH_3$. The testing was effected by dilution test in vitro in a 1 percent glucose bouillon solution.

It has been found that the compounds cited above can easily be prepared by condensation of ethyl cyanoacetate and 3,4,5-trimethoxybenzylchloride with sodium hydride as condensation agent. Condensation may be effected by heating at 110°C for 2 hours to prepare ethyl 2-(3,4,5-trimethoxybenzyl)-cyanoacetate. By further condensation of obtained ester with guanidine in dry alcohol, such as ethanol, in the presence of sodium alkoxyde, such as ethoxyde, by heating to boiling during a period of 3 hours and then by evaporating to dryness under lowered pressure, dissolving the residue in water and precipitating with diluted mineral acid, 2,4-diamino-5-(3,4,5-trimethoxybenzyl)-6-hydroxypyrimidine is prepared. In tautomeric form, this hydroxpyrimidine appears as 2,4-diimino-5-(3,4,5-trimethoxybenzyl)-barbituric acid. By condensation of the prepared hydroxypyrimidine derivative with arylsulphochlorides of the general formula II:

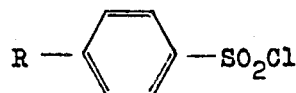

wherein R has the above meaning, and further by addition of acetone and 1 N sodium hydroxyde solution, so that by adding a further quantity of sodium hydroxyde solution, the pH of the reaction mixture is maintained at 9, compounds of the general formula I are prepared. The reaction is carried out during a period of 3 hours at 25°C when R has the meaning of H, $CH_3$, and Cl, and during a period of 4 hours at 0°C when R has the meaning of Br, $NHCOCH_3$, and $NHCOCH_2CH_3$.

The process of the present invention is illustrated in greater detail by the following examples.

EXAMPLE 1

To 100 mls. of ethyl cyanoacetate cooled down to 0°C, there were added in small portions 4 grs. (0.0834 Mole) of a 50 percent suspension of sodium hydride in mineral oil, and then 18 grs. (0.0831 Mole) of 3,4,5-trimethoxybenzylchloride. The reaction mixture was heated to 110°C and stirred at this temperature for 2 hours. The precipitated sodium chloride was removed by vacuum filtration. The unreacted ethyl cyanoacetate was distilled off, and the residue was distilled at 175°–180°C/0.01 mm Hg. A yield of 17.45 grs. (71.7 percent) of pure ethyl 2-(3,4,5-trimethoxybenzyl)-cyanoacetate having a melting point of 37°C was obtained.

EXAMPLE 2

To sodium ethoxyde, prepared by dissolving 0.9 grs. (0.039 Mole) of sodium in 15 mls. of dry ethanol, was added a mixture of 2 grs. (0.0162 Mole) of guanidine nitrate and 3.6 grs. (0.0124 Mole) of ethyl 2-(3,4,5-trimethoxybenzyl)-cyanoacetate. The reaction mixture was heated to boiling for 3 hours and then evaporated to dryness under lowered pressure. To the residue was added 15 mls. of water after which it was acidified to pH 4 by adding a 10 percent hydrochloric acid solution. The separated precipitate was recovered by filtration under suction pressure. The recovered filtrate was recrystallized from dry ethanol. Pure 2,4-diamino-5-(3,4,5-trimethoxybenzyl)-6-hydroxypyrimidine of a melting point of 274°–275°C was obtained.

EXAMPLE 3

A mixture of 3.1 grs. (0.01 Mole) of 2,4-diamino-5-(3,4,5-trimethoxybenzyl)-6-hydroxypyrimidine, 16 mls. of 1 N sodium hydroxyde, 1.9 grs. (0.011 Mole) of benzenesulphochloride, and 10 mls. of acetone was stirred for 3 hours at 25°C. During the reaction, the pH of the reaction mixture was maintained at pH 9 by adding 1 N sodium hydroxyde solution. The separated colourless precipitate was recovered by filtration under suction pressure and recrystallized from 96 percent ethanol. Pure 2,4-diamino-5-(3,4,5-trimethoxybenzyl)-6-benzenesulphonyloxypyrimidine of having a melting point of 222°–223°C was obtained.

EXAMPLE 4

The procedure according to the process described in Example 3 was repeated except that from p-toluenesulphochloride there was obtained 2,4-diamino-5-(3,4,5-trimethoxybenzyl)-6-p-toluenesulphonyloxypyrimidine having a melting point of 206°–208°C.

EXAMPLE 5

The procedure according to the process described in Example 3 was repeated except that from p-chlorobenzenesulphochloride there was obtained 2,4-diamino-5-(3,4,5-trimethoxybenzyl)-6-p-chlorobenzenesulphonyloxypyrimidine of having a melting point of 206°–208°C.

EXAMPLE 6

The procedure according to the process described in Example 3 was repeated except that from p-bromobenzenesulphonylchloride by carrying out the reaction during a period of 4 hours at 0°C, there was obtained 2,4-diamino-5-(3,4,5-trimethoxybenzyl)-6-p-bromobenzenesulphonyloxypyrimidine having a melting point of 203°C.

EXAMPLE 7

The procedure according to the process described in Example 6 was repeated except that from p-acetamidobenzenesulphochloride there was obtained 2,4-diamino-5-(3,4,5-trimethoxybenzyl)-6-p-acetamidobenzenesulphonyloxypyrimidine having a melting point of 206°–207°C.

EXAMPLE 8

The procedure according to the process described in Example 6 was repeated except that from p-propionamidobenzenesulphochloride there was obtained 2,4-diamino-5-(3,4,5-trimethoxybenzyl)-6-p-propionamidobenzenesulphonyloxypyrimidine having a melting point of 189°–190°C.

What we claim is:
1. 2,4-Diamino-5-(3,4,5-trimethoxybenzyl)-6-arylsulphonyloxypyrimidines of the formula:

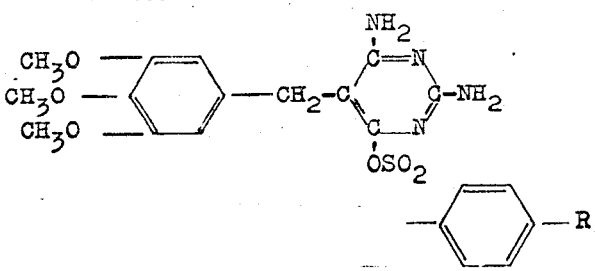

wherein R is a radical of the group consisting of H, $CH_3$, Cl, Br, $NHCOCH_3$, and $NHCOCH_2CH_3$.

* * * * *